Sept. 21, 1948. C. A. BROWN 2,449,766
MEANS FOR PRODUCING UNIFORM FLUID MIXTURES
Filed March 1, 1944 3 Sheets-Sheet 1
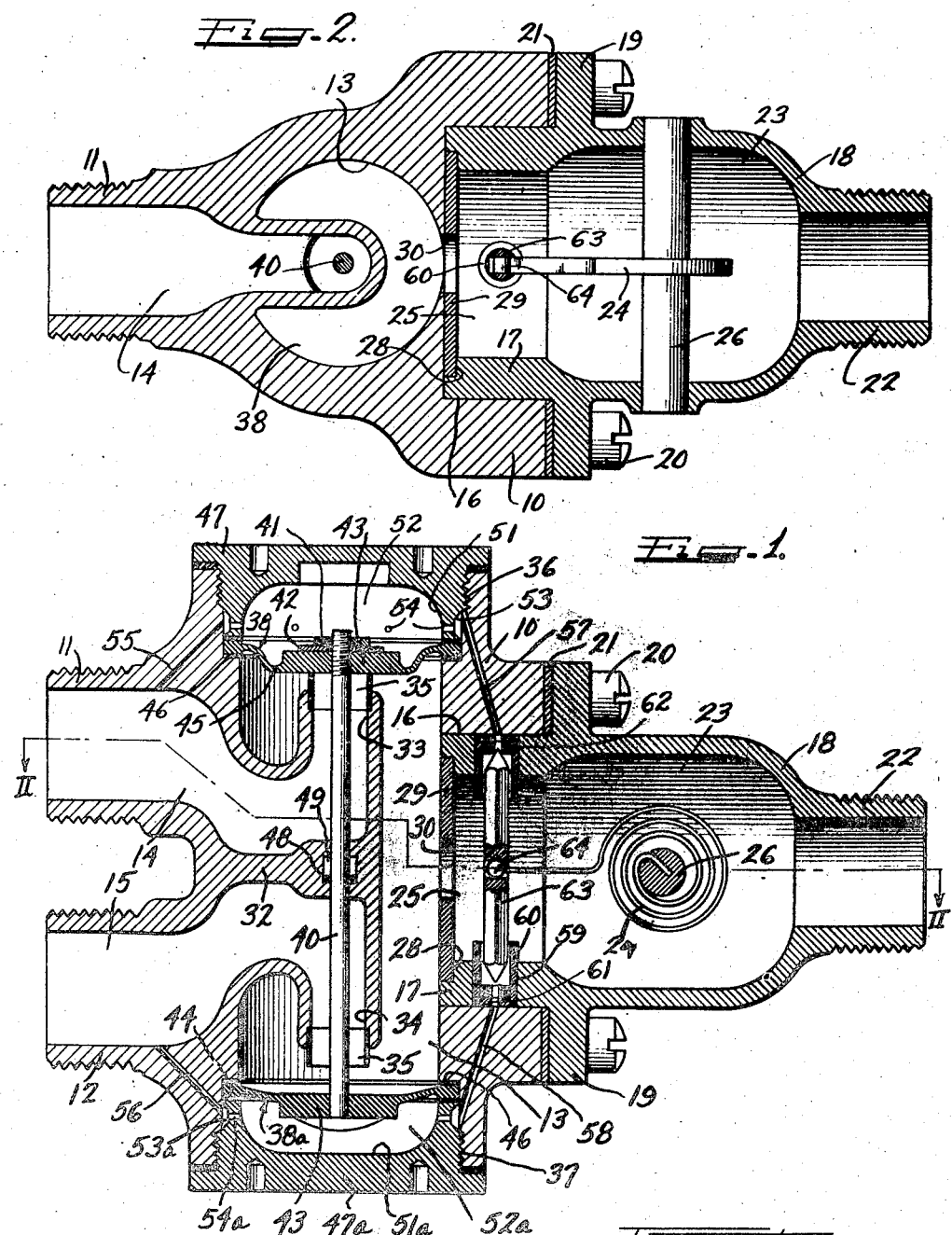

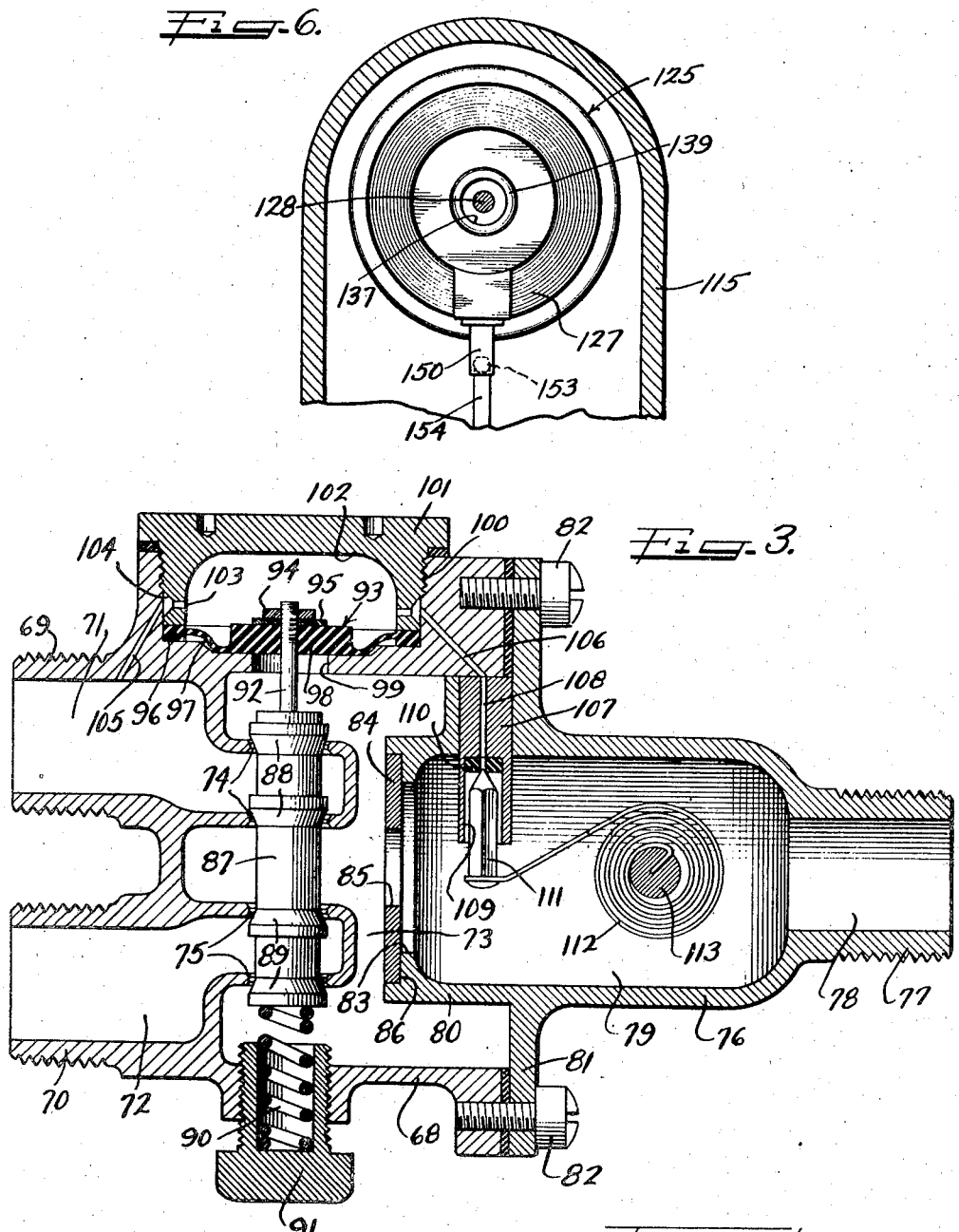

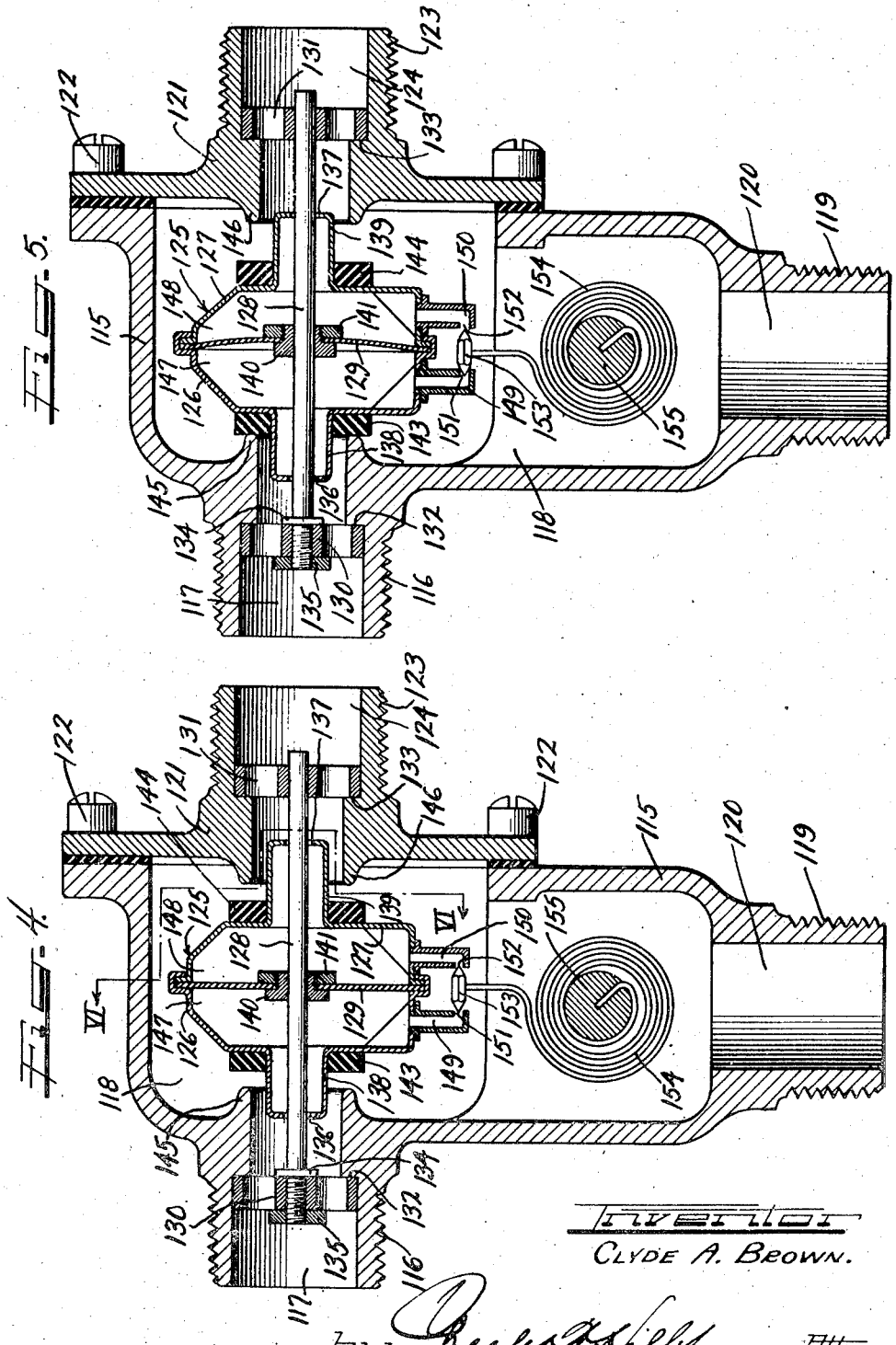

Patented Sept. 21, 1948

2,449,766

UNITED STATES PATENT OFFICE 2,449,766

MEANS FOR PRODUCING UNIFORM FLUID MIXTURES

Clyde A. Brown, Chicago, Ill., assignor to Dole Valve Company, Chicago, Ill., a corporation of Illinois Application March 1, 1944, Serial No. 524,546

4 Claims. (Cl. 236—12)

The present invention relates to a method of and means for producing a uniform fluid mixture from a plurality of individual fluids each of which possesses certain distinct physical characteristics. More particularly, the invention is concerned with a process and apparatus for producing a fluid mixture having a predetermined uniform temperature from fluid supplies of different temperatures.

The term "physical characteristic," as hereinafter employed, refers either to an inherent property of the fluid; or to a temporarily imposed condition or state of the fluid, such for example as temperature or pressure.

In the production of any fluid mixture having a certain predetermined degree of uniformity from a plurality of different fluid supplies, it is necessary to take into account certain variations which may inadvertently occur in the fluid supplies as they are introduced to the mixing area. For instance, in producing a mixed water supply of a predetermined uniform temperature, variations in pressure and temperature of each of the individual supplies going to make up the mixture will result in the non-uniformity of the ultimate combination.

The present invention, therefore, contemplates a method of and means for producing a uniform fluid mixture having certain predetermined optimum characteristics from a plurality of individual fluid supplies having differing physical characteristics or properties and for obtaining this uniform mixture irrespective of changes in the physical characteristics or properties of the component fluid supplies.

It is thus an object of the present invention to provide a method of and means for producing a uniform fluid mixture from a plurality of fluid supplies having differing physical characteristics or properties.

It is a further object of the present invention to provide a method of and means for employing one or more of the characteristics or properties of the individual fluid supplies in controlling the admission of the proper proportions of the component fluids to produce the desired fluid mixture.

A still further object of the present invention is the provision of a means for mixing the proper proportions of the component fluid supplies to produce a mixture having the desired predetermined physical characteristics or properties.

Another and still further object of the present invention involves the provision of a thermostatically controlled means which serves to create a pressure differential between portions of the several fluid supplies employed in producing a given fluid mixture for controlling the admission of the individual fluid supplies to the mixing area.

It is a still further object of the present invention to provide a mixing device having a mixing area to which a plurality of fluids are to be admitted in the desired proportions for combination to produce a mixture of the fluids combining the several physical properties or characteristics of the individual supplies.

A further object of the present invention is the provision of a means for utilizing the fluids employed in producing the desired mixture to operate a plurality of fluid pressure responsive means in such manner that they are out of phase with each other with respect to the dynamic forces which tend to cause a pulsating or chattering condition.

It is a still further object of the invention to provide a structure for accomplishing the foregoing purposes which is simple in construction, low in cost and effective in its operation.

For the sake of clarification, the invention may be more fully described by reference to the accompanying drawings in which are illustrated three embodiments of a mixer valve structure which employ the principles of the present invention. The mixer valve units illustrated in the drawings are advantageously designed to produce a mixed fluid of predetermined constant temperature from a plurality of fluid supplies of different temperatures. The temperature of the mixed fluid discharged from the valve of the present invention remains constant in accordance with the predetermined setting of the thermosensitive element provided in the unit in spite of inadvertent, but frequently occurring, fluctuations in the temperature and pressure of each component fluid supply.

On the drawings:

Figure 1 represents a section taken through one form of mixer valve unit embodying the principles of the present invention;

Figure 2 is a section through the mixer valve unit of Figure 1 taken substantially along the line II—II;

Figure 3 is a section, corresponding generally with Figure 1, of another form of mixer valve unit which embodies the teachings of the present invention;

Figure 4 is a section, corresponding generally to that of Figure 1, through still another form of mixer valve unit;

Figure 5 corresponds generally to Figure 4 but illustrates the mode of operation of the valve unit; and Figure 6 is a fragmentary section taken along the line VI—VI in Figure 4.

As shown on the drawings:

The valve unit illustrated in Figures 1 and 2 of the drawings is of the double diaphragm pilot operated type which is advantageously employed in mixing hot and cold water to produce a mixed water supply of predetermined constant temperature. The structure comprises a casing 10 provided with a pair of externally threaded inlet connections 11 and 12 for connecting with suitable supply conduits for introducing hot and cold water, respectively, to the internally disposed mixing chamber 13 in the casing 10 by means of inlet passages 14 and 15 associated with said connections 11 and 12 respectively. An opening 16 is provided in the wall of the casing 10 substantially opposite the point at which the inlet passages 14 and 15 are disposed for communication with the mixing chamber 13 in said casing 10.

An extension 18 having a projection 17 and a flanged portion 19 is adapted to be inserted in the opening 16 in the wall of casing 10 in such fashion that the flanged portion 19 will register with the outer wall of casing 10. The extension 18 is secured to the casing 10 as by means of a plurality of fastening means, such as the machine screws 20, which may be threaded into holes provided in the casing wall. A suitable gasket 21 is provided at the junction of the flanged portion 19 with the wall of the casing 10 to prevent the leakage of fluid from the mixing chamber 13 through the opening 16 and between the casing 10 and extension 18.

The extension 18 provides an externally threaded connection 22 to which may be secured any suitable form of fluid conduit for handling the mixed water supply discharged from the mixer valve unit. The outlet connection 22 communicates with the thermostat chamber 23 formed within the extension 18 in which is disposed a suitable thermo-sensitive element 24. The thermostat chamber 23, in turn, connects with the mixing chamber 13 of the casing 10 as by means of the bore 25 extending through the projection 17 of the extension 18.

The thermostatic element 24 may conveniently take any suitable form, being illustrated here as being a bi-metallic coil which is supported in any suitable fashion, such for example, as by means of the pin 26. The pin 26, to which an end of the coil of the thermostatic element 24 is secured, extends transversely of the thermostat chamber 23 and is supported by the walls of the extension 18. While it is preferable that the thermostatic element 24 of the mixer valve unit be adjusted to provide a desired predetermined temperature of the mixed water supply when it leaves the factory, means may advantageously be provided to afford adjustment of the setting to provide a certain degree of flexibility in the operation of the unit.

A counterbore in the end of the bore 25 cut into projection 17 of the extension 18 and adjacent the mixing chamber 13 forms a shoulder 28 which accommodates a plate 29 which may be press fit or otherwise suitably secured therein. The plate 29 is provided with an orifice 30 disposed substantially centrally thereof for regulating the flow of the fluid from the mixing chamber 13 into the thermostat chamber 23 of the extension 18 by way of the bore 25.

The inlet passages 14 and 15 are separated by a wall portion 32 disposed internally of the casing 10 and have outlets 33 and 34, respectively, at the mixing chamber 13. The outlets 33 and 34 have annularly shaped inserts 35 disposed in the openings thereof to afford valve seats. The inserts 35 may be secured in the outlets 33 and 34 in any suitable fashion, but are advantageously inserted in such a way that they form little or no obstruction to the flow of fluid therethrough to the mixing chamber 13.

A pair of openings 36 and 37 are provided extending through the wall of the casing 10 opposite each of the outlets 33 and 34 with their axes substantially normal to the inlet passages 14, 15 and the opening 16 in the casing so as to communicate with the mixing chamber 13. A pair of annularly shaped diaphragms 38, 38a are mounted at opposite ends of a headed rod 40 which passes through a centrally disposed aperture in the reinforced central valve portion 43 of each diaphragm and is slidably carried in apertures in the wall 32 of the casing 10. The rod 40 is threaded at one end to receive a nut 41 backed by a washer 42 to serve as an adjustment for the spacing between the valve portions 43 of said diaphragms 38, 38a.

The diaphragms 38 and 38a may be formed of rubber, synthetic rubber, neoprene or other similar material to produce the desired flexibility of operation. Each diaphragm comprises an external annular bead portion 44 and an imperforate flexible web portion 45 which supports the centrally disposed valve portion 43 adapted to seat against the insert 35 in the outlets 33 or 34 of inlet passages 14 and 15, respectively. The diaphragms 38, 38a are secured in place against an annular shoulder 46, formed by counterboring the openings 36 and 37, as by means of the thimbles 47, 47a which are threaded into said openings 36 and 37. Suitable gaskets may be provided on opposite sides of the bead portions 44 of the diaphragms 38, 3a and under the flanged ends of thimbles 47, 47a to prevent leakage of fluid from the mixing chamber 13.

The rod member 40, at the point where it passes through the internal wall 32, is supplied with a packing ring 48 disposed about its periphery. The packing ring 48 is disposed in an enclosure 49 formed within the wall 32 which permits said packing ring to move axially with the rod 40 without restricting the freedom of movement of the rod.

Recesses 51, 51a are formed in the under side of thimbles 47, 47a and cooperate with the diaphragms 38, 38a to provide enclosed chambers 52, 52a. An annular groove 53, 53a, is cut into the external periphery of each thimble 47, 47a and communicates with recesses 51, 51a through a plurality of substantially radially extending apertures 54, 54a. Each groove 53, 53a is connected with its associated inlet passage 14 or 15, as the case may be, through their respective passageways 55 or 56. Similar passageways 57 and 58 interconnect the grooves 53 and 53a, respectively, with the opening 16 in the wall of casing 10.

The projection 17 of the extension 18 has a pair of oppositely disposed apertures 59 extending through the wall thereof and accommodating the generally cylindrically shaped guides 60. Each of the guides 60 has an aperture 61 in the base thereof which registers with the passageway 57 or 58, as the case may be. A washer 62 composed of rubber, artificial rubber, neoprene or other similar material is secured in the base of each guide 60 in such fashion that its aperture registers with the aperture 61 in the base of the guide 60.

The washers 62 serve to form a somewhat more flexible contact for the generally cone-shaped ends of a pilot valve 63 which extends transversely of the bore 25 of the projection 17 of extension 18. The pilot valve 63 is flexibly mounted upon the free end of the thermostatic element 24 as by means of the slot and cylinder connection 64 to control the flow of fluid through the passages 57 and 58. The inwardly projecting generally cylindrical walls of the guides 60 serve to aid in centering the cone-shaped ends of the pilot valve 63 with respect to the openings in the washers 62 against which these ends seat in the operation of the device.

In the operation of the mixer valve unit of the present invention, the fluid supplied by the conduits connected to inlet passages 14 and 15 passes into the mixing chamber 13, and through the orifice 30 in plate 29 into the thermostat chamber 23. The thermostatic element 24, as already indicated, has been adjusted to produce a fluid mixture of a desired predetermined temperature.

As the fluid entering the thermostat chamber 23 comes into contact with the thermostatic element 24, the element reacts to cause the pilot valve 63 to seat against one of the washers 62 in one of the guides 60 which tends to cut off either passageway 57, if the fluid mixture is too hot, or passageway 58 if the mixture is too cold. It will be understood that when the temperature of the mixed fluid entering the thermostat chamber is substantially the same as that for which the thermostat is set, the pilot valve 63 will be balanced at some point between the extremities of its lateral movement.

When the individual fluid supplies are introduced to their respective inlet passages 14 and 15 at the start of the operations, a small part of each fluid supply by-passes through passageways 55 and 56 into the chambers 52 and 52a formed by recesses 51 and 51a in thimbles 47 and 47a and out through passageways 57 and 58 into the thermostat chamber 23. By reason of the fact that the several passageways are open when the pilot valve is positioned equidistant the washers 62 in guides 60 the fluid pressure on the diaphragms 38 and 38a adjacent the recesses 51 and 51a of thimbles 37 and 37a is substantially equal. The fluid will, thus, continue to flow into the mixing chamber 13 through outlets 33 and 34 until a variation in temperature or pressure of the fluid supplies occurs.

If a change in temperature or pressure takes place in one or both of the fluid supplies, the thermostatic element 24 immediately operates to shift the pilot valve 63 to adjust the opening through which the fluid escapes from chambers 52 or 52a, as the case may be, to compensate for this variation. Let us assume that the temperature of the hot fluid admitted through inlet passage 14 drops. The thermostatic element 24 instantly reacts to the lowering of the temperature of the mixed fluid, thus moving the pilot valve 63 toward a position to close off the passage 58 and thereby causing the passage 57 to be opened more.

The opening of passage 57 causes the fluid to drain more rapidly from chamber 52 thereby reducing the fluid pressure on diaphragm 38 within the chamber 52. Conversely, the closing of passage 58 simultaneously creates a greater pressure against the diaphragm 38a in the chamber 52a.

A temporary pressure differential will thus exist externally of diaphragms 38 and 38a which causes the rod 40 to shift axially. The valve portion 43 of diaphragm 38 recedes farther from its seat on insert 35 in outlet 33 while the valve portion 43 of diaphragm 38a is urged toward its seat on its associated insert 35 in outlet 34. The aforementioned operations permit the admission of a greater proportion of hot fluid and a consequent diminution of the supply of cold fluid to mixing chamber 13.

With the elements disposed in the position shown in Figure 1 of the drawings, the hot fluid supply is temporarily closed off completely. When the temperature of the mixed fluid has been adjusted to the temperature for which the thermostatic element 24 is set, the pilot valve 63 will be shifted and the flow of hot fluid again restored in the manner above described.

A change in the pressure of one of the fluid supplies for the mixer valve unit will cause the structure to react in a manner similar to that just described as being caused by a variation in temperature. It will be understood that the opposite operation takes place in the event that the temperature of the hot fluid supply increases or the pressure of the cold fluid supply is reduced, bringing about a consequent change in the mixed fluid temperature.

The principle of operation involved, therefore, is one of utilizing the pressure in the individual fluid supplies controlled by a pilot valve actuated by a thermosensitive element to create a pressure differential to open and close the outlets through which the fluid supplies are admitted to the mixing area.

The mixer valve unit of Figures 1 and 2 is particularly advantageous in that the use of two diaphragms overcomes chattering by reason of the fact that the diaphragms will always be out of phase with respect to each other as far as dynamic forces tending to produce a pulsating condition are concerned.

The embodiment of the invention illustrated in Figure 3 of the drawings is generally similar to that shown in Figures 1 and 2. The mixing valve unit of Figure 3 embodies a casing 68 having externally threaded fluid connections 69 and 70, the first of which is adapted to be connected to a suitable conduit supplying hot fluid and the other for receiving a conduit handling cold fluid. The connections 69 and 70 have inlet passages 71 and 72, respectively, associated therewith which connect with a mixing chamber 73 disposed internally of the casing 68 as by means of the outlet openings 74 and 75, respectively, taking the form of valve seats.

An extension 76 has an outlet connection 77 which is externally threaded for receiving a suitable conduit for handling the mixed fluid discharged from the thermostat chamber 78 therein through the outlet 79. The extension 76 comprises a projection 80 which extends through the wall of the casing 68 in such fashion that the flanged portion 81 of the extension 76 may be secured to said casing, as for example, by screws 82. A suitable gasket may advantageously be provided to prevent leakage between the casing 68 and the extension 76.

The thermostat chamber 78 in the extension 76 communicates with the mixing chamber 73 in the casing 68 as by means of an opening 83. The opening 83 which extends through the end wall of the projection 80 has a plate 84 mounted therein having a centrally disposed orifice 85. The plate 84 may be secured in the end of the projection 80 of extension 76 as by being press fit against a shoulder 86 formed about the opening 83 in the end of said projection 80.

The valve for controlling the flow of fluid through each pair of outlet openings 74 and 75 in the inlet passages 71 and 72, respectively, advantageously takes the form of a spool valve 87. The valve 87 has a plurality of spaced, generally frusto-conically shaped portions 88 and 89 thereon for seating in said outlet openings 74 and 75. The valve 87 is supported at one end thereof by means of a coil spring 90 which is adapted to be adjustably positioned against the end of said valve as by means of the guide member 91 adjustably threaded into the wall of casing 68.

The valve 87 has a threaded rod 92 extending substantially axially from its other end through an opening 89 in the wall of the casing 68 to engage a diaphragm 93. The rod 92 extends through a centrally disposed aperture in the diaphragm 93 and is secured thereto by a nut 94 threaded on rod 92 and backed by a washer 95. The diaphragm 93 which is substantially identical to the diaphragms 38, 38a of the embodiment of the invention illustrated in Figures 1 and 2 previously described has an annular bead 96, an imperforate web portion 97 and a reinforced centrally disposed portion 98.

A bore 100 is provided in the wall of the casing 68 and disposed concentrically with the opening 89 to receive diaphragm 93 which is held in place in the base thereof by the thimble 101 which is threaded into the bore 100 and engages the bead 96 of said diaphragm. The joint formed between the thimble 101 and the outer wall of the casing 68 may conveniently be sealed by the use of suitable gaskets.

The thimble 101 is provided with a recess 102 in the under side thereof disposed adjacent the diaphragm 93. The recess 102 is adapted to communicate with an annular groove 104 formed about the external periphery of the thimble 101 adjacent the end thereof contacting the bead portion 96 of the diaphragm 93 through a plurality of ports 103 extending substantially radially through the wall of said thimble 101.

The annular groove 104 on the thimble 102 advantageously forms a completely closed channel with respect to the wall of the bore 100 in the casing 68 and is connected, as by means of a passageway 105, with the inlet passage 71 associated with the hot fluid connection 69. A similar passageway 106 connects the aforementioned channel formed between the annular groove 104 and the wall of the bore 100 with the external periphery of the projection 80 of the extension 76.

A guide member 107 which may advantageously be of generally cylindrical form is inserted in and extends through the wall of the projection 80 of the extension 76. The guide member 107 is so disposed that an axially extending passage 108 in said guide member 107 connects the base of a bore 109 therein with the passageway 106 formed in the casing 68 and connecting with the groove 104. The bore 109 in the inserted guide member 107 is provided in its base with a substantially flexible washer element 110, the central aperture of which registers with the passage 108 and is adapted to receive for controlling the flow of fluid therethrough the substantially conically shaped end of a pilot valve 111 which extends into the bore 109.

The pilot valve 111 is secured to the free end of a thermo-sensitive means in the form of a bimetal coil type thermostatic element 112. The other end of thermostatic element 112 is secured to a pin 113 which is disposed within and extends transversely of the thermostat chamber 79 in the extension 76.

The principle of operation of this mixer valve unit is generally similar to that of the unit of Figures 1 and 2 of the drawings.

For the purpose of illustration, let us assume that the temperature of the fluid mixture rises above that for which the thermostatic element 112 is adjusted. In such case, the thermostatic element 112 causes the pilot valve 111 to approach a seating position against the washer 110, as shown in Figure 3, thereby temporarily closing off the passageway 106 and passage 108 to cause the fluid pressure within the recess 102 to increase. This increased pressure on the diaphragm 93 causes the valve 87 to move axially against the spring 90 thereby tending to seat the frusto-conical portions 88 in the outlets 74 reducing the flow of hot fluid admitted to mixing chamber 73 from inlet passage 71. The frusto-conical portions 89 are simultaneously caused to move away from a seating position in outlets 75 thereby increasing the flow of cold fluid to the mixing chamber 73.

As soon as the temperature of the mixed fluid is adjusted to the predetermined temperature setting for the thermostatic element 112, the pilot valve 111 is immediately shifted to open the passageway 106 and passage 108. This operation reduces the fluid pressure in recess 102 and permits the spring 90 to overcome the pressure against diaphragm 93, thereby shifting valve member 87 to reduce the flow of cold fluid and increase the flow of hot fluid into the mixing chamber 73.

As before, the opposite operation takes place if the temperature of the mixed fluid drops. The mixer valve unit of Figure 3, like that of Figures 1 and 2, is sensitive to pressure variations occurring in the individual fluid supplies.

The embodiment of the invention illustrated in Figures 4 to 6 inclusive of the drawings, although operating on the same general principle of the structures of Figures 1 to 3 inclusive, differs considerably therefrom in its construction.

According to this embodiment of the invention, the mixer valve unit comprises a casing 115 having an externally threaded inlet connection 116 providing an inlet passage 117 for connection with a supply of hot fluid and directing it to the chamber 118. The casing 115 is also provided with an externally threaded connection 119 with which is associated an outlet passage 120 which also connects with the internal chamber 118 of the casing. A cover member 121 is mounted upon the casing 115 as by means of a plurality of screws 122 and the joint formed between the cover 121 and the casing 115 is suitably gasketed to prevent leakage therebetween. The cover member 121 has an externally threaded inlet connection 123 which is adapted to be connected to a suitable conduit for supplying cold fluid to the chamber 118 in the casing 115 through the inlet passage 124 associated therewith.

A substantially rigid enclosure member 125 made up of two correspondingly shaped shells 126 and 127 secured together in any suitable fashion is supported in the chamber 118 from a rod 128 by means of a membrane 129 which is composed of some suitable flexible material. The rod 128 extends axially of the inlet passages 117 and 124 and transversely of the chamber 118, being supported therein by a pair of perforated members 130 and 131 which are inserted in said inlet passages 117 and 124, respectively, to register against shoulders 132 and 133 therein. One end of the rod 128 is threaded and provided with a flanged portion 134 and nut 135 for engaging perforated member 130 to prevent shiftable movement of the rod.

The rod 128 extends through openings 136 and 137 in the protuberances 138 and 139, respectively, formed upon the opposite walls of the shells 126 and 127 of the member 125. The membrane 129 is fixed to the rod 128 as by means of the male lock nut 140 and female nut 141 which cooperate to engage the periphery of a centrally disposed aperture in the membrane and are disposed at a point substantially equidistant from the ends of said rod.

Disposed about the protuberances 138 and 139 are the valve members 143 and 144, respectively, which advantageously take the form of rings composed of a suitable flexible material, such, for example, as rubber, artificial rubber, neoprene and the like. The valve members 143 and 144 are adapted to contact the seats 145 and 146, respectively, extending into the chamber 118 and formed about the innermost end of the inlet passages 117 and 124.

The membrane 129 serves to divide the enclosure member 125 into a pair of oppositely disposed internal fluid chambers 147 and 148. The fluid chambers 147 and 148 have associated therewith members 149 and 150 which provide outlet ports 151 and 152 for cooperation with a pilot valve 153, the oppositely disposed coneshaped ends of which are adapted to alternately open and close ports 151 and 152 to aid in manipulating the valve members 143 and 144 to maintain a predetermined temperature of the fluid in the mixing chamber 118. To accomplish this, the pilot valve 153 is mounted upon the free end of a suitable bi-metal coil thermostat 154 disposed adjacent the outlet passage 120 of the chamber 118.

The other end of the thermostatic element 154 is secured to a pin 155 which is disposed transversely of the chamber 118 and supported by the walls of the casing 115. If desired, means may be provided externally of the casing 115 for adjustably positioning the pin 155, thereby enabling the adjustment of the thermostatic element 154 to produce a mixture of fluid of any desired temperature. In such thermostatic mixing valve units, it is, however, customary to set the thermostatic element 154 to produce a mixed fluid supply of a predetermined temperature before the unit is shipped out by the manufacturer to be employed in a fluid system.

The mixer valve unit illustrated in Figures 4 to 6, inclusive, operates in substantially the same manner as the previously described embodiments of the invention. When the elements of the structure are in the respective positions illustrated in Figure 4, the hot and cold fluids enter their respective inlet passages 117 and 124. The fluids pass through openings 136 and 137 in shells 126 and 127 into fluid chambers 147 and 148 and out through outlet ports 151 and 152 into chamber 118, since the pilot valve is positioned equidistant the outlet ports 151 and 152.

This condition continues only so long as the temperature of the mixed fluid in chamber 118 is equivalent to the predetermined temperature setting for the thermostatic element 154. Assuming that the temperature of the mixed fluid rises above the predetermined normal temperature, the pilot valve 153 will be shifted by the thermostatic element 154 toward the outlet port 151 associated with fluid chamber 147 (see Figure 5). The closing of outlet port 151 causes the hot fluid to be retained in fluid chamber 147 while the cold fluid in chamber 148 on the opposite side of membrane 129 is drained out through its outlet port 152 more rapidly.

This operation creates a pressure differential on opposite sides of the membrane 129 resulting in the deformation of the membrane thereby bodily shifting the enclosure member 125 to the left, as seen in Figure 5. The valve member 143 is thus caused to approach the seat 145 reducing the flow of the hot fluid entering the chamber 118 through inlet passage 117. The shifting of the enclosure member 125 simultaneously causes the valve member 144 to be moved away from its seat 146 so as to permit an increased flow of cold fluid into chamber 118.

As in the previously described embodiments, a drop in the temperature of the mixed fluid brings about the reverse of the above operations. Variations in the pressures of the individual fluid supplies also effect the same operation of the device for the reason that the proportion of hot and cold fluid entering is altered. As a result, the thermostatic element, in each instance, operates to shift the pilot valve to create a pressure differential upon a pressure responsive means which results in the re-adjustment of quantities of the component fluids which are combined to form the mixed fluid discharged by the unit.

It will be apparent that the mixer valve unit of the present invention is adapted to use in the mixing together of any fluids having differing characteristics or properties to produce a mixed fluid characterized by a determined optimum combination of these characteristics. It is intended to include within the scope of the terms "physical characteristics" and "properties" as applied to the fluids employed in the mixing operation, such features as temperature, pressure, moisture content and the like. Each of these characteristics of the component fluids may readily be employed to aid in producing the result sought to be accomplished.

It will, of course, be understood that various details of construction may be varied through a wide range without departing from the principles of this invention and it is, therefore, not the purpose to limit the patent granted hereon otherwise than necessitated by the scope of the appended claims.

What I claim is:

1. A mixer valve comprising a housing, an inlet in said housing for each of two fluids under pressure, valve means associated with each of said inlets, an outlet in said housing for the mixed fluid, a mixing chamber in said housing, a fluid container within the housing, a flexible membrane separating the container into adjoining fluid chambers each of which communicates with an inlet, a drain for each fluid chamber, pilot valve means in each drain, said pilot valve means being mounted to selectively open one drain and close the other, said membrane being secured substantially at its center thereby to enable the container to shift bodily as the membrane is deformed, said valve means being operable by movement of said container to alternately open one inlet and close the other in varying degree, thereby to control the admission of fluid to the mixing chamber.

2. A mixer valve comprising a housing having a pair of inlet chambers for receiving fluid under pressure, a mixing chamber in said housing, a port between each of said inlet chambers and said mixing chamber, an outlet in said housing for delivering mixed fluid from said mixing chamber, a fluid container within the housing, a flexible diaphragm separating the container into adjoining fluid chambers each of which communicates with an inlet chamber, a drain for each container fluid chamber, pilot valve means in each drain, said pilot valve means being selectively operable to open one drain and close the other a varying amount, mounting means on said housing for securing said diaphragm substantially at its center thereby to enable said container to shift bodily as the diaphragm is deformed, and a valve member on each of the opposite sides of said container arranged to control the opening and closing of said port whereby to control the admission of fluid to said mixing chamber.

3. A mixer valve for producing a fluid mixture of predetermined uniform temperature from two fluids under pressure having different temperatures, said mixer valve comprising a housing, an inlet in said housing for each fluid, valve means in said inlets, an outlet in said housing, for the mixed fluid, a mixing chamber in said housing, a thermo-sensitive element in said housing between said inlets and said outlet, an enclosure within said housing, a flexible membrane separating said enclosure into adjoining fluid chambers, a passageway connecting each chamber with one of said inlets, a drain for each fluid chamber, said drain having a substantially larger effective area at its outlet than the effective inlet area of its associated passageway, pilot valve means in each of said drains, said pilot valve means being mounted on and actuated by said thermo-sensitive element to alternately open one drain and close the other, and a mounting means which holds substantially a center portion of said membrane in fixed position while permitting the outer portion to flex when said membrane is subjected to an unbalanced pressure condition thereby to shift said enclosure bodily to cause said valve means to alternately open one inlet and close the other by seating against said housing for controlling the admission of fluid to said mixing chamber.

4. A mixer valve comprising a housing, an inlet in said housing for each of two fluids under pressure, valve means associated with each of said inlets, an outlet in said housing for the mixed fluid, a mixing chamber in said housing, a fluid container within said housing, a flexible membrane separating the container into adjoining fluid chambers each of which communicates with one of said inlets, a fluid drain for each fluid chamber, a valve in each drain, said valves being mounted to selectively open one drain and close the other, said container being free to shift bodily due to the flexing action of said flexible membrane, said valve means being operable by movement of said container to alternately open one inlet and close the other in varying degree, thereby to control the admission of fluid to the mixing chamber.

CLYDE A. BROWN.

REFERENCES CITED

The following references are of record in the file of this patent:

UNITED STATES PATENTS

| Number | Name | Date |
|---|---|---|
| 1,658,928 | Langdon | Feb. 14, 1928 |
| 1,784,061 | Giesler | Dec. 9, 1930 |
| 1,869,663 | Cartier | Aug. 2, 1932 |
| 2,086,129 | Hamilton | July 6, 1937 |
| 2,145,114 | Gibbs | Jan. 24, 1939 |
| 2,200,318 | Yonkers | May 14, 1940 |
| 2,217,017 | Hoopes | Oct. 8, 1940 |
| 2,272,403 | Fields | Feb. 10, 1942 |
| 2,308,165 | Fields | Jan. 12, 1943 |
| 2,316,075 | King | Apr. 16, 1943 |

FOREIGN PATENTS

| Number | Country | Date |
|---|---|---|
| 720,112 | France | Dec. 3, 1931 |
| 824,202 | France | Nov. 3, 1937 |